Oct. 12, 1926. 1,602,630
E. L. WHITE
WHEEL
Filed Jan. 17, 1925
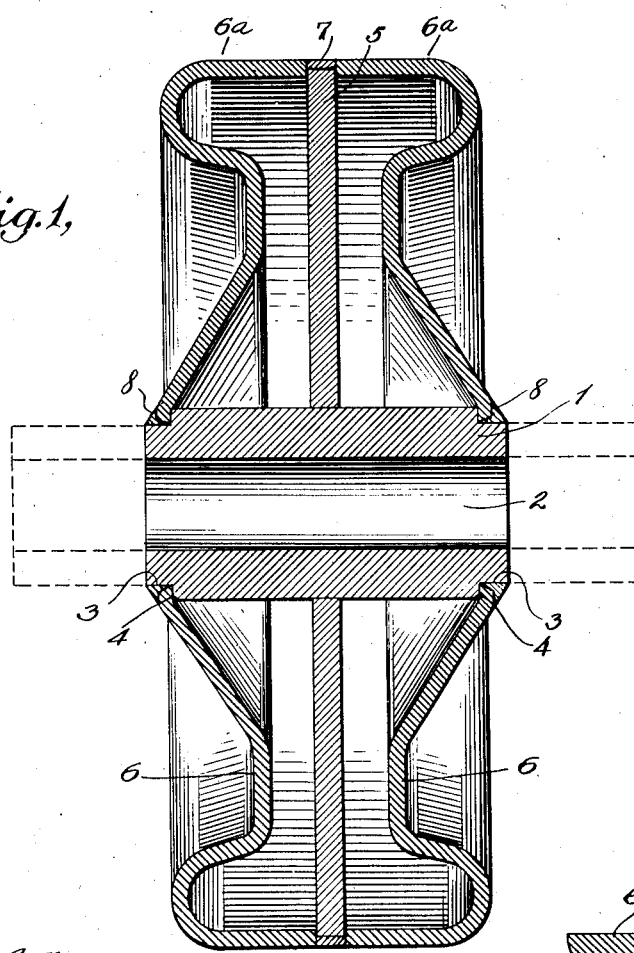
Fig. 1,
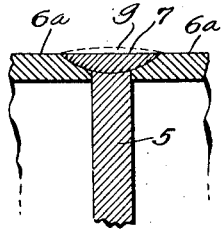
Fig. 3,
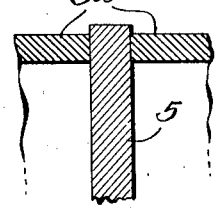
Fig. 2,
Edward L. White
INVENTOR
BY
Henry M. Bingham
ATTORNEY Patented Oct. 12, 1926.

1,602,630

UNITED STATES PATENT OFFICE.

EDWARD L. WHITE, OF TENAFLY, NEW JERSEY.

WHEEL.

Application filed January 17, 1925. Serial No. 3,004.

My invention relates to improvements in wheels and particularly to that type of wheels made, pressed or stamped out of sheet metal, which are particularly adapted for trucks, dollies and the like, and the objects of my improvement are to provide a stronger wheel of stamped or pressed sheet metal which shall be pleasing in appearance, light in weight, rigid, durable and easily manufactured and assembled.

The other objects of my invention are more fully pointed out in the following specification:

I obtain these objects by the mechanism illustrated in the accompanying drawing in which Figure 1 is a section of my improved wheel. Figure 2 is a sectional view showing the tread flanges and strengthening disc partly broken away, of the preferred form of my invention before the weld has been made. Figure 3 is a similar view after the weld has been made.

The hub 1 is provided with a central bore 2 to receive the shaft upon which the wheel is mounted. The ends of the hub are reduced in diameter at 3 providing shoulders 4. The hub may be formed from a bar of steel, but is preferably fabricated from a forging. A strengthening disc 5, having a central aperture, is slipped over the hub as shown. The sides 6, stamped or formed out of sheet metal, are identical in form. They are then assembled as shown in Figure 1. The strengthening disc 5 is of such diameter that it will extend into the space between the adjacent edges of the tread flanges 6ª of the respective side plates. When the parts are so assembled the periphery of the disc and the adjacent edges of the tread portion of the side plates are welded together and the channel between the adjacent edges of the tread flanges of the side plates filled with metal flowed into the channel during the welding process, as shown at 7.

Preferably, as shown in Figure 2, the disc 5 is of such diameter that it projects beyond the tread flanges 6ª, the extension being sufficient to provide sufficient metal to make the proper weld and leave a minimum ridge indicated by the dotted line 9, which is thereafter ground and machined away. I prefer to so form the sides 6 that when they abut against the shoulders 4 the tread portions 6ª will stand slightly away from the disc 5 and then force the sides toward each other until the tread portions 6ª are in contact with the disc 5 and weld them together and to the disc 5 while in that position and under tension.

The hub and the adjacent portions of the side plates are then welded together at 8 and a surplus of metal is preferably deposited which may be ground to the conformation shown in the accompanying drawings, which gives the appearance of a wheel constructed from a single piece of metal. The use of a disc of such diameter as to extend radially beyond the channel between the adjacent edges of the side plates renders it easy and convenient to accurately assemble the parts. The other advantages of using a disc which projects beyond the edges of the side plates are that material is thus supplied for making the weld and that a more perfect weld can thus be made between the adjacent edges of the side plates and the discs, and the welding operation can be more rapidly performed and at less expense.

As shown on the dotted lines, the hub portion may be formed of any desired length and then cut to any length required to meet the conditions under which it is to be utilized. This is important where the wheel is designed for use for replacement of wheels of various hub lengths. It will be noted that the hub is of a rugged construction with ample surface to receive and resist side thrusts and the wear incidental thereto. My wheel so constructed is strong, durable and light and there is no tendency of the side plates or strengthening disc to become loose on the hub and thereafter rapidly deteriorate as is the case with the wheels formed from sheet metal which have heretofore been constructed.

Having described my invention, I claim:

1. A wheel, comprising in combination a hub, having a bore to receive a shaft, reduced end portions and shoulders, side members struck from sheet metal, adapted to slip over the reduced end portions of said hub and to abut against the shoulders respectively on said hub, a strengthening disc mounted on said hub and extending into the channel between the adjacent tread portions of the side plates, the side plates being welded to the hub and to each other and the strengthening disc.

2. A wheel comprising in combination a hub, having a bore to receive a shaft, side members struck from sheet metal welded to the hub, a strengthening disc mounted on said hub and extending into the channel between the adjacent tread portions of the side plates and the adjacent edges of the side plates being welded to the strengthening disc and to each other.

3. A wheel comprising in combination a hub having a bore to receive a shaft, side members formed from sheet metal, each side piece being provided with a flanged tread portion, a strengthening disc mounted on said hub, the said side members being welded to the hub and the adjacent edges of the tread portions of the side plates being welded to each other and to the periphery of the strengthening disc.

4. A wheel comprising in combination a hub, side members formed from sheet metal, having flanges to serve as tread portions of the wheel, said side portions being welded to the hub and the adjacent edges of the tread portions to each other and a strengthening disc mounted on said hub so as to brace the tread flanges of the side members.

5. A wheel comprising in combination a hub having reduced end portions and shoulders, side members stamped from sheet metal slipped over the reduced ends of such hubs and abutting against such said shoulders, flanged tread portions on said side members, said side members being sprung toward each other and the tread portions welded to each other.

Jan. 16, 1925.

EDWARD L. WHITE.